(12) United States Patent
Martinez

(10) Patent No.: US 9,820,363 B2
(45) Date of Patent: Nov. 14, 2017

(54) SYSTEM AND METHOD FOR ILLUMINATION OF A RAIN GUTTER

(71) Applicant: Stephane Martinez, Chesterfield, MO (US)

(72) Inventor: Stephane Martinez, Chesterfield, MO (US)

( * ) Notice: Subject to any disclaimer, the term of this patent is extended or adjusted under 35 U.S.C. 154(b) by 0 days.

(21) Appl. No.: 15/459,923

(22) Filed: Mar. 15, 2017

(65) Prior Publication Data

US 2017/0188439 A1    Jun. 29, 2017

Related U.S. Application Data

(63) Continuation-in-part of application No. 14/590,111, filed on Jan. 6, 2015, now Pat. No. 9,603,221, which
(Continued)

(51) Int. Cl.
| | | |
|---|---|---|
| *H05B 37/00* | (2006.01) | |
| *H05B 37/02* | (2006.01) | |
| *G09F 13/04* | (2006.01) | |
| *G09F 13/06* | (2006.01) | |
| *F21V 33/00* | (2006.01) | |
| *F21V 3/02* | (2006.01) | |
| *F21S 4/24* | (2016.01) | |
| *F21W 121/00* | (2006.01) | |
| *F21Y 103/00* | (2016.01) | |

(52) U.S. Cl.
CPC ............ *H05B 37/0272* (2013.01); *F21S 4/24* (2016.01); *F21V 3/02* (2013.01); *F21V 33/006* (2013.01); *G09F 13/0413* (2013.01); *G09F 13/06* (2013.01); *F21W 2121/00* (2013.01); *F21Y 2103/00* (2013.01); *G09F 2013/0454* (2013.01)

(58) Field of Classification Search
CPC ......... F21W 2121/004; F21W 2121/00; F21W 2121/04; F21W 2121/006; F21V 33/006; F21V 21/08; F21V 23/06; F21V 1/22; F21V 21/005; F21V 21/0808; F21V 23/00; F21V 3/0445; F21V 15/01; F21V 15/013
See application file for complete search history.

(56) References Cited

U.S. PATENT DOCUMENTS 5,226,724 A    7/1993    Kanarek
6,955,458 B2   10/2005   Cheema
(Continued)

FOREIGN PATENT DOCUMENTS

JP    2008202367 A    9/2008

OTHER PUBLICATIONS

International Search Report, International Patent Application No. PCT/US2013/051229, dated Oct. 7, 2013 (11 pages).
(Continued)

*Primary Examiner* — Monica C King
(74) *Attorney, Agent, or Firm* — Lewis Rice LLC

(57) ABSTRACT

A rain gutter illumination system having a cover for attaching to a rain gutter with an aperture along the substantial length of the cover, and opposing recesses for retaining a decorative insert. When the decorative insert is inserted in the cover, it is held in place by the recesses, and a light source and optional diffusing panel may be arranged in the cover so that the light source projects light through the aperture of the illuminable surface. The light source may be remotely controllable using a wireless remote control device, such as a smart phone over a network connection.

19 Claims, 9 Drawing Sheets

Related U.S. Application Data is a continuation-in-part of application No. 13/554,757, filed on Jul. 20, 2012, now Pat. No. 8,956,000.

(56) References Cited

U.S. PATENT DOCUMENTS

| | | |
|---|---|---|
| 8,251,543 B2 | 8/2012 | Bauer |
| 8,944,632 B2 | 2/2015 | Tveit |
| 8,956,000 B2 | 2/2015 | Martinez |
| 2002/0144441 A1 | 10/2002 | Zentmire et al. |
| 2003/0198054 A1 | 10/2003 | Adams |
| 2007/0114337 A1 | 5/2007 | Rommelmann, Jr. |
| 2008/0068857 A1 | 3/2008 | Meinke et al. |
| 2011/0107683 A1 | 5/2011 | Ringuette |
| 2011/0188250 A1 | 8/2011 | Waldhuetter et al. |
| 2013/0271004 A1 | 10/2013 | Min et al. |
| 2014/0022767 A1 | 1/2014 | Martinez |
| 2014/0091719 A1 | 4/2014 | Tsai |
| 2015/0204489 A1 | 7/2015 | Baello |

OTHER PUBLICATIONS

International Search Report, International Patent Application No. PCT/US2016/013905, dated Mar. 24, 2016 (9 pages).

SYSTEM AND METHOD FOR ILLUMINATION OF A RAIN GUTTER

CROSS REFERENCE TO RELATED APPLICATIONS

This application is a Continuation of U.S. Utility patent application Ser. No. 14/590,111, filed Jan. 6, 2015, which is a Continuation-in-Part of U.S. Utility patent application Ser. No. 13/554,757, filed Jul. 20, 2012, and now patented as U.S. Pat. No. 8,956,000. The entire disclosures of all of these documents are incorporated herein by reference.

FIELD OF THE INVENTION

This disclosure relates to the field of illumination for residential and commercial structures. In particular, to the use of rain gutters and similar structural elements for decorative illumination.

DESCRIPTION OF THE RELATED ART

Commercial and residential buildings are usually decorated in some fashion. While illumination is generally a practical element of a structure, lighting also serves a dual role as décor. The décor of a structure often varies through the seasons, holidays, and during special events, and specialized lighting may be used to augment these variations in décor. In particular, it is a nearly universal practice in the United States to decorate both the interior and exterior of practically any structure with strings of small lights during the Christmas season.

For exterior lighting, specialized lighting is often hung from the rain gutters attached to the home or other structure. Attaching lighting to a rain gutter is particularly desirable because the linear design of a rain gutter, combined with its usual location along the edges of roof surfaces, creates a bright, aesthetically-pleasing affect by highlighting the major surfaces of the building and drawing attention to the structure. The lights are meant to inspire in both the decorator and viewer a sense of mirth and warmth, despite the cold weather and short winter days.

However, rain gutters are a particularly difficult structural element to decorate because the gutter is designed to channel water, not accept decorations. Rain gutters are designed to support the relatively evenly-distributed weight of water flowing through the gutter trough and, in particular, the side walls of the rain gutter are designed to withstand the relatively low lateral pressure of parallel water flow, and not to support an amount of weight attached at any one point. Further, the time of year when people most wish to decorate rain gutters—winter—is the very time of year that gutters tend to be under the greatest stress, caused by the presence of ice or snow in the gutter trough. Thus, to avoid damaging the gutter or the item being hung from it, decorators avoid the use of heavy decorations on rain gutters.

Also, the materials used in rain gutter construction present problems. While rain gutters can be constructed from a wide variety of materials, ranging from steel to wood to concrete, most modern rain gutters are made from light metals and plastics, such as aluminum and vinyl. These materials are smooth and have low coefficients of friction, which makes it difficult to attach decorations or use adhesives. The decorator also cannot get around this by drilling holes in the gutters because the holes lower the overall structural strength of the gutter and impair the rain gutter's ability to capture and channel water. Additionally, rain gutters are a highly visible structural element and a rain gutter full of visible punctures gives the entire structure the undesirable appearance of a ramshackle, poorly-maintained building, lowering property and/or lease value.

Thus, decorators are confined to hanging only very light decorations from rain gutters, such as strings of small Christmas lights, and they do so using specialized equipment, such as light plastic or metal clips that attach to the nose of the gutter and provide a projection from which to hang the light string. In order to present the desirable linear appearance in the string of lights, many dozens of these clips must be attached closely together to prevent sagging in the light strings. In practical terms, this means the decorator must spend a significant amount of time balanced at the top of a ladder or precariously perched at the edge of the roof in order to attach these clips and hang the lights from them and then to take them all down again when the holiday season has passed.

For structures with high eaves, this task is particularly dangerous, and falls can result in serious injury. The Center for Disease Control reports that from 2000 to 2003 alone, more than 15,000 people were treated in emergency rooms for fall-related injuries sustained while hanging Christmas decorations. [CDC Fall-Related Injuries During the Holiday Season (2004)]. While Christmas is the primary season for decorating rain gutters, lights for other seasons, notably Halloween, are becoming more common, adding to the risk of injury and damage.

There are few practical methods for decorating a rain gutter, and the available methods are fraught with risk to the decorator, the rain gutter, the decorations, and the building. Thus, rain gutter décor is generally confined to the creative possibilities available with a lightweight string of lights, such as the popular "icicle" affect. Further, the hassle and hazard of decorating rain gutters even with these light strings is serious enough that a market has emerged for small businesses whose sole service offering is to hang and remove Christmas lights. Finally, even though these strings of lights are attractive at night, during the daytime the dark wires are highly visible and visually unappealing.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Because of these and other problems in the art, described herein, among other things, is a system for illuminating rain gutters. This system utilizes a cover and a source of illumination to project illumination through one or more apertures in decorative shapes so as to project an illuminated representation of the decorative shape of the aperture outwardly to a spectator. Depending on, among other things, the effect desired and the viewing angle of the spectator, the illumination may project in any direction from the structure to which the apparatus is attached.

Described herein, among things, is a rain gutter illumination system comprising: a hanger generally in an inverted U-shape and including a stem having a distal end; an illuminable surface attached to the distal end of the stem and including an interior side, an exterior side opposing the interior side, and an aperture from the interior side to the exterior side; a generally L-shaped base including a leg, a foot having a proximal end attached to the leg and a distal end attached to the illuminable surface; a source of illumination projecting illumination through the aperture such that an illuminated representation of the aperture is projected from the exterior side of the illuminable surface.

In an embodiment, the rain gutter illumination system is further comprised of a diffusing panel insert adjacent to the aperture.

In an embodiment, the diffusing panel insert is generally translucent.

In an embodiment, the diffusing panel insert is generally transparent.

In an embodiment, the rain gutter illumination system is further comprised of a decorative insert adjacent to the aperture and including an interior side, an exterior side opposing the interior side, and an aperture from the interior side to the exterior side.

In an embodiment, the aperture of the decorative insert is in the shape of a seasonally-themed symbol.

In an embodiment, the aperture of the decorative insert is in the shape of a typographical glyph.

In an embodiment, the aperture of the decorative insert is in the shape of a logo or trademark.

In an embodiment, the source of illumination is selected from the group consisting of: single-color lights, multi-color lights, flashing lights, blinking lights, strobe lights, runway lights, black lights.

Also described herein, among other things, is a method for decorative illumination comprising: providing an illumination system comprising a hanger, a base, a source of illumination, and an illuminable surface including an interior side, an exterior side opposing the interior side, and an aperture from the interior side to the exterior side; placing the illumination system on a rain gutter; illuminating the source of illumination to project illumination through the aperture.

In an embodiment of the method, the method further comprises: in the providing, the illumination system further comprises a diffusing panel insert; locating the diffusing panel insert between the source of illumination and the illuminable surface; illuminating the source of illumination to project illumination through the diffusing panel insert.

In an embodiment of the method, the method further comprises: in the providing, the illumination system further comprises a decorative insert including an interior side, an exterior side opposing the interior side, and an aperture from the interior side to the exterior side; locating the decorative insert between the source of illumination and the illuminable surface; illuminating the source of illumination to project illumination through the aperture of the decorative insert.

DESCRIPTION OF PREFERRED EMBODIMENT(S)

Figure 1A:
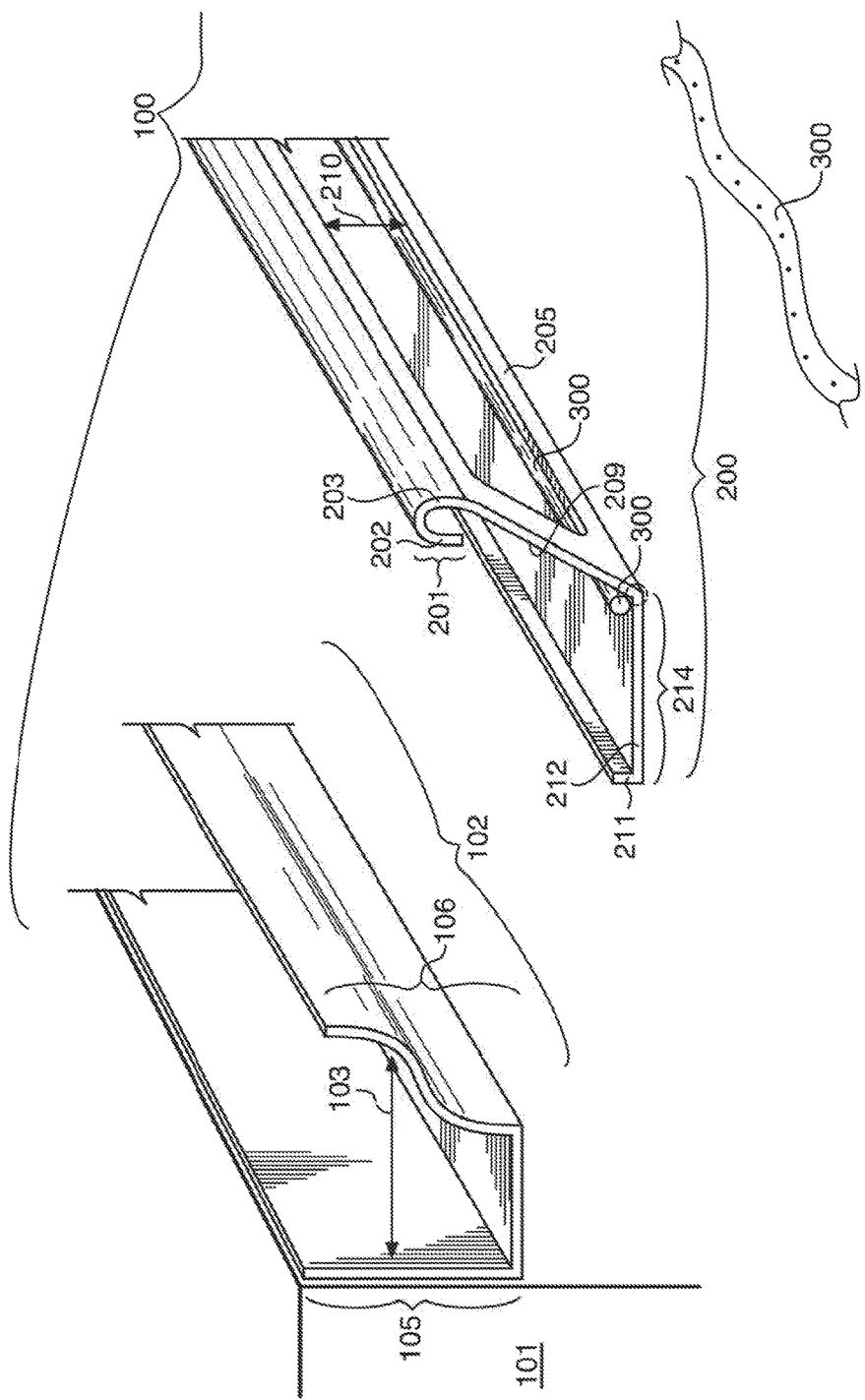
FIGS. 1A-1B provide an exploded view of an embodiment of the rain gutter illumination system. The spatial relationship of the components depicted in FIGS. 1A and 1B are for purpose of clarity and are not intended to represent or imply a spatial relationship between or among the depicted elements.

Although the present invention is described with particular reference to the accompanying drawings, it is to be understood at the outset that it is contemplated that the present invention may vary in specific detail from that illustrated and described herein while still achieving the desirable characteristics and features of the present invention. Accordingly, the description that follows is intended to be understood as a broad enabling disclosure directed to persons skilled in the applicable arts, and is not to be understood as being restrictive.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g. "a remote host"), or may, in verb form, refer to a server providing a service over a network ("hosts a website"), or an access point for a service over a network.

Figure 1B:
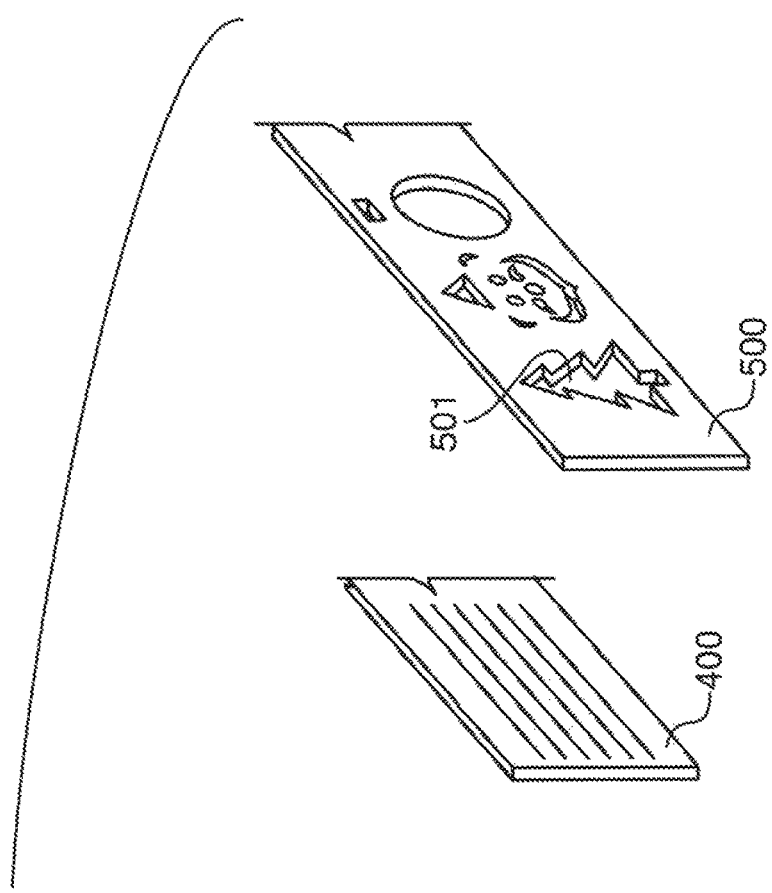

FIGS. 1A and 1B provide an exploded view of an embodiment of the rain gutter illumination system (100). The rain gutter illumination system (100) may consist of an individual rain gutter (102) section or multiple sections attached together. In an embodiment, a plurality of apparatuses is used to illuminate a rain gutter (102). FIGS. 1A and 1B show various components of the system in isolation from one another for sake of clarity and the depicted spatial relationship is not intended to suggest, imply, or represent a relationship between or among the components.

The building (101) is generally a commercial or residential structure but may be any structure to which a rain gutter (102) may be attached. An embodiment of a rain gutter (102) is shown affixed to the building (101) generally parallel to the top of the building (101) but the rain gutter (102) may be attached to the building (101) in any fashion.

The rain gutter (102) will generally be constructed of aluminum or vinyl but may be constructed of any material sufficiently rigid to maintain its own shape (102), including but not limited to: cast iron, lead, zinc, copper, steel, stainless steel, a metal alloy, a galvanized metal or steel, PVC, plastic, vinyl, concrete, stone, or wood. The rain gutter (102) may be adorned or decorated, including but not limited to, by painting, staining, embossing, or antiquing.

In the depicted embodiment, the rain gutter (102) is affixed to the building (101) by the rain gutter's (102) interior wall (105), but in an embodiment the rain gutter (102) may be affixed to the building (101) in any fashion, including but not limited to by use of hardware or other components not depicted in FIG. 1A. In the depicted embodiment, the exterior wall (106) of the rain gutter (102) has a contoured shape and the interior wall (105) is generally a flat, elongated polyhedron, but in an embodiment the specific shape of the interior wall (105) and exterior wall (106) may vary from the depicted embodiment and the characteristics of the channel (103) likewise may vary. The profile shape of the rain gutter (102) may include, without limitation: K-style, O/G, ogee, half-round, quarter-round, plain fascia, tile fascia, curved fascia, curved tile, decco, decco tile, box, box deep, box shallow, rolled box, box bead, rolled box bead, double bead, or winged.

In the depicted embodiment, the cover (200) comprises a single hanger (201) comprising an elongated section attached longitudinally to an embodiment of the illuminable surface (205), which is also an elongated section attached longitudinally to the base (214). In the depicted embodiment, the hanger (201) and the base (214) affix or stabilize the cover (200) to the rain gutter (102) such that the cover (200) will remain mostly stationary once in place. The illuminable surface (205) may also be referred to as a side element (205) or illuminable element (205).

Figure 6:
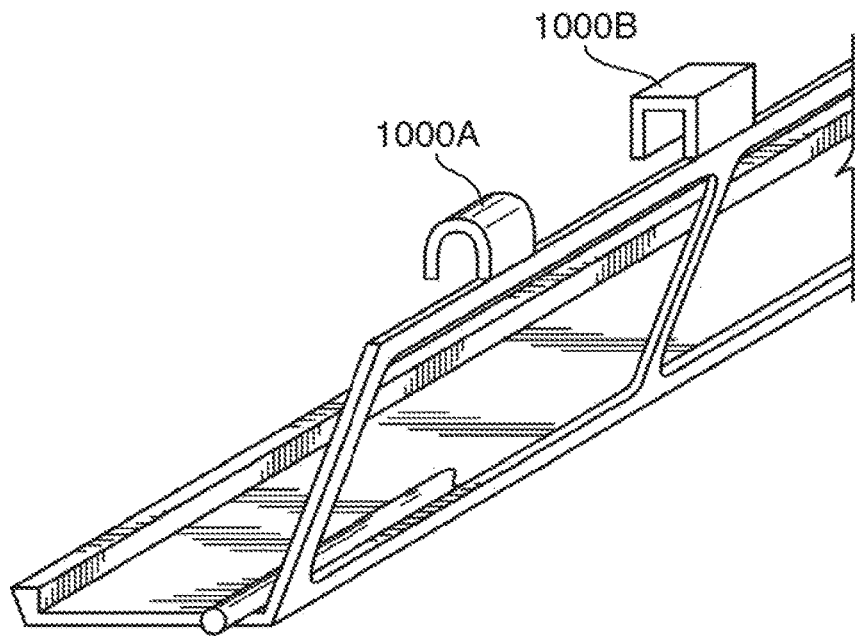
FIG. 6 provides an embodiment of the rain gutter illumination system. In this embodiment, the rain gutter illumination system does not include an embodiment of a diffusing panel, nor of a decorative insert. In this embodiment, there is more than one hanger, and the shape of the hanger varies.
Figure 7:
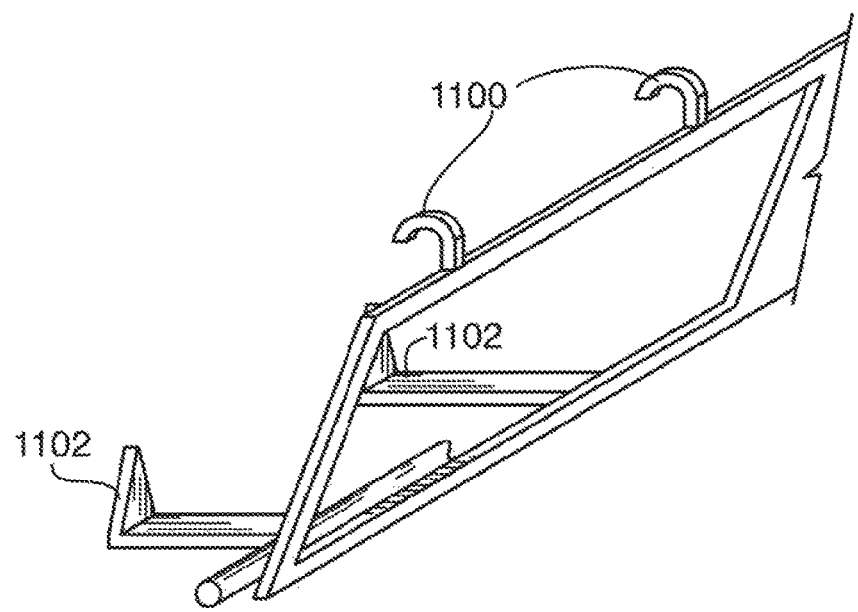
FIG. 7 provides an embodiment of the rain gutter illumination system. In this embodiment, the rain gutter illumination system does not include an embodiment of a diffusing panel, nor of a decorative insert. In this embodiment, the system includes more than one hanger, and more than one base.

In the depicted embodiment, the hanger (201) is sized and shaped for attaching to a rain gutter (102). In the depicted embodiment, the hanger (201) is a single elongated element generally in the shape of a curved, inverted U, with stems (202, 203) of approximately the same length, thickness, and shape. However, in an embodiment, the hanger (201) may be of any size or shape appropriate for attaching to a rain gutter (102) and the specific size and shape of the hanger (201), including but not limited to the quantity, shape, size, length, thickness, spacing, and arrangement of the hanger or hangers (201) will necessarily vary depending on the size and shape of the particular rain gutter (102) with which a given embodiment of the rain gutter illumination system (100) is designed to be used. For example, in the embodiment depicted in FIG. 6, the apparatus includes two hangers (1000A) and (1000B) which are not elongated sections, and which are not the same design, one being curved and the other being orthogonal. Similarly, in the embodiment depicted in FIG. 7, the apparatus again includes two hangers (1100), both being the same design and having one stem that is longer than the other.

The hanger (201) may be made from any material of sufficient rigidity to maintain its own shape and of sufficient strength to support the rain gutter illumination system (100), including but not limited to: aluminum, cast iron, lead, zinc, copper, steel, stainless steel, a metal alloy, a galvanized metal or steel, PVC, plastic, vinyl, concrete, stone, or wood. In an embodiment, the hanger (201) may be made from the same material or materials as another element of the rain gutter illumination system (100). In an embodiment, the hanger (201) may be made from a different material or materials than another element of the rain gutter illumination system (100).

In the depicted embodiment, the base (214) is sized and shaped for attaching to a rain gutter (102). The depicted embodiment of the base (214) is a single elongated element generally in the shape of an orthogonal L, with a short leg (211) extending above the foot (212) and the leg (211) is attached to the foot (212) generally perpendicularly. In the depicted embodiment, the base (214) provides a supporting surface for a source of illumination (300), but in an embodiment the source of illumination (300) may be attached to, or supported by, another element of the rain gutter illumination system (100), including but not limited to by hardware or other components not depicted in FIGS. 1A-1B. In an embodiment, the source of illumination (300) is attached to the illuminable surface (205). In another embodiment, the source of illumination (300) is attached to the rain gutter (102).

In an embodiment, the size and shape of the base (214), including but not limited to the quantity, shape, size, length, thickness, spacing, and arrangement of the base or bases (214) or legs (212) or feet (211) will necessarily vary depending on the size and shape of the particular rain gutter (102) with which a given embodiment of the rain gutter illumination system (100) is designed to be used. For example, in the embodiment depicted in FIG. 7, the apparatus has a plurality of bases (1103), neither of which is elongated and both of which have triangular legs (1102).

In an embodiment of the base (214): there is no leg (211); there is no foot (212); the leg (211) extends above or below the foot (212); the leg (211) is attached to the building (101); the foot (212) is attached to the building; the leg (211) and the foot (212) are arranged in a non-perpendicular fashion; the leg (211) is longer than the foot (212); there is more than one base (214); the base (214) includes more than one foot (212); the base (214) includes more than one leg (211); a foot (212) includes more than one leg (211); a leg (211) includes more than one foot (212); the base (214), leg (211), or foot (212) contain one or more apertures, vents, drains, or other openings; the base (214) is T-shaped; the base (214) is shaped other than in an the shape of an L. In an embodiment, the source of illumination (300) projects light through an aperture in the base (214).

The base (214) may be made from any material of sufficient rigidity to maintain its own shape, including but not limited to: aluminum, cast iron, lead, zinc, copper, steel, stainless steel, a metal alloy, a galvanized metal or steel, PVC, plastic, vinyl, concrete, stone, or wood. In an embodiment, the base (214) may be made from the same material or materials as another element of the rain gutter illumination system (100). In an embodiment, the base (214) may be made from a different material or materials than another element of the rain gutter illumination system (100).

In the depicted embodiment, the rain gutter illumination system (100) is attached to the rain gutter (102) by placing the hanger (201) over the exterior wall (106) of the rain gutter (102), and placing the leg (211) of the base (214) between the interior wall (105) of the rain gutter (102) and the building (101). In the depicted embodiment, the base (214) provides support for the source of illumination (300), which is located between the interior side (209) of the illuminable surface (205) and the exterior wall (106) of the rain gutter (102). There are other means by which the cover (200) may be attached to the rain gutter (102) and/or stabilized, including but not limited to static pressure and the use of hardware, adhesives, or other components not depicted in FIGS. 1A-1B.

In the depicted embodiment, the illuminable surface (205) is sized and shaped to provide an aperture (210) through which the source of illumination (300) projects illumination. Also in the depicted embodiment, the illuminable surface (205) is an elongated polyhedron attached longitudinally to an embodiment of a hanger (201) and also attached longitudinally to an embodiment of a base (214). However, the illuminable surface (205) need not be polyhedral and may be, by way of example and not limitation: spheroidal, toroidal, ellipsoidal, or lentoidal.

In the depicted embodiment, the illuminable surface (205) is configured at an angle of approximately 105° to the base (214), and at an angle of approximately 165° to the exterior stem (203) of the hanger (201). In an embodiment, the angles at which the components are attached to each other will vary depending on a number of factors, including but not limited to: the specific size and shape of each component; the size, shape, and orientation of the rain gutter (102); and the location from which spectators view the aperture (210) in the illuminable surface (205).

In an embodiment, the rain gutter illumination system (100) is attached to a rain gutter (102) attached to a building (101) and spectators view the aperture (210) from an elevation lower than the elevation of the rain gutter illumination system (100). In such an embodiment, the angle of the illuminable surface (205) to the base (214) is generally greater than 90°.

In an embodiment, the angle between the illuminable surface (205) and the base (214) is: less than 15°; less than 30°; less than 45°; less than 60°; less than 75°; less than 90°; less than 105°; less than 120°; less than 135°; less than 150°; less than 165°; less than 180°; less than 195°; less than 210°; less than 225°; less than 240°; less than 255°; less than 270°; less than 285°; less than 300°; less than 315°; less than 330°; less than 345°; less than 360°.

In an embodiment, the angle between the interior side (109) of the illuminable surface (205) and the base (214) is: greater than 0°; greater than 15°; greater than 30°; greater than 45°; greater than 60°; greater than 75°; greater than 90°; greater than 105°; greater than 120°; greater than 135°; greater than 150°; greater than 165°; greater than 180°; greater than 195°; greater than 210°; greater than 225°; greater than 240°; greater than 255°; greater than 270°; greater than 285°; greater than 300°; greater than 315°; greater than 330°; greater than 345°.

In an embodiment, the rain gutter illumination system (100) is attached to a rain gutter (102) attached to a building (101) and spectators view the aperture (210) from an elevation higher than the elevation of the rain gutter illumination system (100). In such an embodiment, the angle of the illuminable surface (205) to the base (214) is generally less than 90°.

In an embodiment, the angle between the illuminable surface (205) and the hanger (201) is: less than 15°; less than 30°; less than 45°; less than 60°; less than 75°; less than 90°; less than 105°; less than 120°; less than 135°; less than 150°; less than 165°; less than 180°; less than 195°; less than 210°; less than 225°; less than 240°; less than 255°; less than 270°; less than 285°; less than 300°; less than 315°; less than 330°; less than 345°; less than 360°.

In an embodiment, the angle between the illuminable surface (205) and the hanger (201) is: greater than 0°; greater than 15°; greater than 30°; greater than 45°; greater than 60°; greater than 75°; greater than 90°; greater than 105°; greater than 120°; greater than 135°; greater than 150°; greater than 165°; greater than 180°; greater than 195°; greater than 210°; greater than 225°; greater than 240°; greater than 255°; greater than 270°; greater than 285°; greater than 300°; greater than 315°; greater than 320°; greater than 345°.

In the depicted embodiment, the source of illumination (300) is a light ribbon, but the source of illumination (300) may be any type of lighting, including but not limited to: a light string, light ribbon, strip lighting, tape light, flexible lighting, gas lights, electrical lights, natural lights, candles, or lamps. In an embodiment, the source of illumination (300) may have special uses, properties or affects, including but not limited to: single color lights, muti-color lights, flashing lights, blinking lights, strobe lights, runway lights, or black lights. In an embodiment, the source of illumination (300) is illuminated such that each aperture (501) is illuminated in a designated sequence. In a similar embodiment, the apertures (501) are shaped like frames of an animation and when the source of illumination (300) is illuminated such that each aperture (501) is illuminated in a designed sequence, the apparatus presents the impression of an animation progressing along the apparatus.

The illuminable surface (205) may be made from any material of sufficient rigidity to maintain its own shape, including but not limited to: aluminum, cast iron, lead, zinc, copper, steel, stainless steel, a metal alloy, a galvanized metal or steel, PVC, plastic, vinyl, concrete, stone, or wood.

In an embodiment, the illuminable surface (205) is made from the same material or materials as another element of the rain gutter illumination system (100). In an embodiment, the illuminable surface (205) is made from a different material or materials than another element of the rain gutter illumination system (100).

Although in the depicted embodiment the illuminable surface (205) has one large, generally orthogonal aperture (210) through which the source of illumination (300) projects illumination, in an embodiment the aperture (210) may be of any size, shape, or configuration. For example, in the embodiment depicted in FIG. 5, the illuminable surface (205) has multiple apertures (210) in different, decorative shapes, and the illuminable surface (205) provides the decorative element of the apparatus. This use may be preferred where the desired decorative character of the apertures (210) is fixed. By way of example and not limitation, one such use is by commercial enterprises wherein the decorative shapes of the apertures (210) are themed to match the goods or services offered or sold by the enterprise, such as a retail store, restaurant, or vacation resort.

In an embodiment, the cover (200) is removable and/or detachable from the rain gutter (102) and/or building (101) and may be removed and/or detached as needed, including but not limited to for cleaning, repair, replacement, improvement, and maintenance. In the typical mode of use, the cover (200) is attached to the rain gutter (102) and left in place indefinitely. In an embodiment, there may be one or more gaps between the cover (200) and rain gutter (102). In an embodiment having one or more gaps between the cover (200) and rain gutter (102), one or more of the gaps may be partially or fully filled with a waterproofing barrier, including without limitation a butyl sealant.

Figure 4:
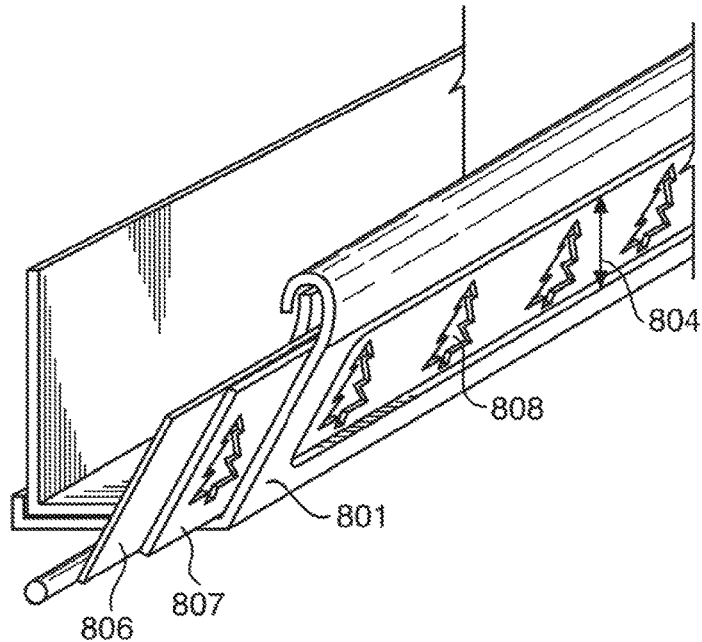
FIG. 4 provides an assembled view of an embodiment of the rain gutter illumination system. In this embodiment, the rain gutter illumination system includes an embodiment of a diffusing panel insert, and a decorative insert.

In the embodiment depicted in FIG. 4, the apparatus includes a decorative insert (807) placed in the apparatus such that the decorative insert (807) is visible through an aperture (804) in the illuminable surface (801), and the decorative insert (807) generally blocks illumination from being projected through the aperture (804) of the illuminable surface (801), except for where such illumination is projected through an aperture or apertures (808) in the decorative insert (807). In the depicted embodiment, the apparatus also includes a diffusing panel insert (806) but the apparatus may be used with a decorative insert (807) and without a diffusing panel insert (806). In an embodiment, the apparatus may have more than one decorative insert (807) and/or more than one diffusing panel insert (806). In an embodiment, some illumination may "bleed" through gaps between the decorative insert (807) and the illuminable surface (801), whether by or despite the design of the embodiment of the apparatus. In a further embodiment, the diffusing panel insert (806) may be held in place by additional components not depicted, including without limitation brackets and/or channels.

In an embodiment including a decorative insert (500), the decorative insert (500) may be changed from season to season and from event to event without having to change or alter the cover (200). This use may be preferred where the decorative character of the apparatus will change frequently. One such use is for a residential structure wherein the decorator of such structure wishes to match the décor of the structure with the holiday or season. Also by way of example and not limitation, another such use is for a commercial enterprise which hosts events at a location hall, wherein the décor of the location is changed to match a particular event at the location, such as a graduation, bar mitzvah, wedding, or retirement party. In an embodiment, the decorative insert (500) may be held in place by additional components not depicted, including without limitation brackets and/or channels. In an embodiment also including a diffusing panel insert (806) held in place by additional components, the same or different components may be used to hold the diffusing panel insert (806) and decorative insert (807, 500) in place.

In an embodiment, the decorative theme is or includes a religious or secular holiday or season, including, but not limited to: New Year's Day, Boxing Day, Valentine's Day, President's Day, St. Patrick's Day, Easter, Lent, Mardi Gras, May Day, Cinco de Mayo, April Fool's Day, Good Friday, Chinese New Year, Labor Day, Memorial Day, Columbus Day, Flag Day, Armed Forces Day, Independence Day, Father's Day, Mother's Day, Halloween, Thanksgiving, All Saint's Day, Christmas, Advent, Chanukah, Yom Kippur, or Rosh Hashanah.

In an embodiment, the decorative theme is or includes an event, occasion or cause, including, but not limited to: wedding, marriage, civil union, adoption, birth, graduation, anniversary, birthday, retirement, welcome home, welcome to the neighborhood, get well, shower, donation, bon voyage, proposal, good luck, congratulations, back to school, sympathy, military deployment or return, bar mitzvah, bat mitzvah, or gratitude.

In an embodiment, the decorative theme is or includes a hobby, interest, or organization, including but not limited to: games, video games, board games, gambling, poker, cards, television, photography, movies, music, dance, theater, opera, sports, motor sports, vacation, travel, military, carpentry, outdoor recreation, hunting, fishing, exercise, adventure, science, science fiction, fantasy, history, painting, pottery, cooking, food, dining, beer, wine, or spirits.

In an embodiment, the decorative theme is or includes letters, numbers, or other typographical glyphs, in any typesetting, font or style of any language or communicative means, including but not limited to: natural languages, artificial languages, fictional languages, dead languages, hieroglyphic languages, Morse code, computer programming languages, binary, octal, hexadecimal and Braille.

In an embodiment, the decorative theme is or includes a corporate or other commercial identity, including but not limited to a logo or trademark.

The decorative insert (500) may be made from any material of sufficient rigidity to maintain its own shape, including, but not limited to: aluminum, cast iron, lead, zinc, steel, copper, stainless steel, a metal alloy, a galvanized metal or steel, PVC, plastic, vinyl, concrete, stone, or wood. In an embodiment, the decorative insert (500) may be made from the same material or materials as another element of the rain gutter illumination system (100). In an embodiment, the decorative insert (500) may be made from a different material or materials than another element of the rain gutter illumination system (100).

Figure 2:
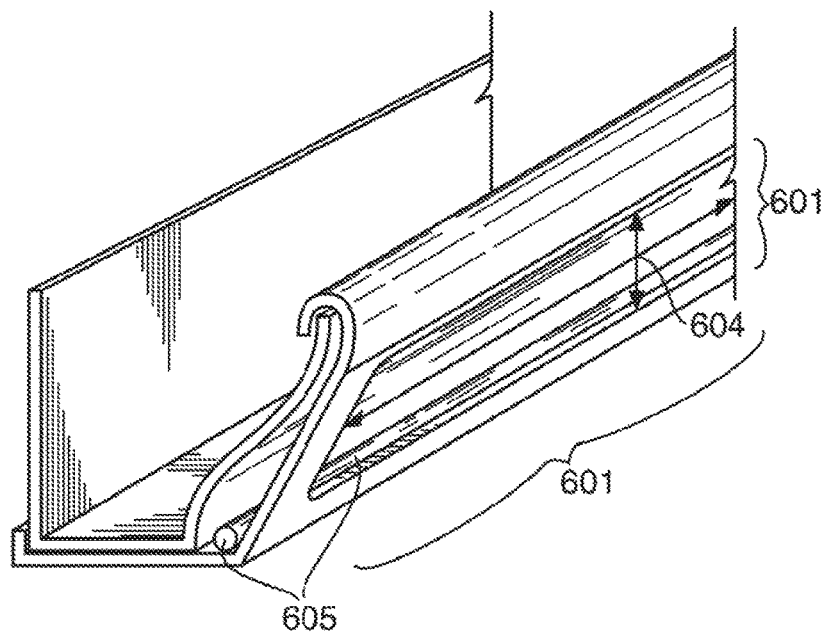
FIG. 2 provides an assembled view of an embodiment of the rain gutter illumination system. In this embodiment, the rain gutter illumination system does not include an embodiment of a diffusing panel insert, nor of a decorative insert.
Figure 3:
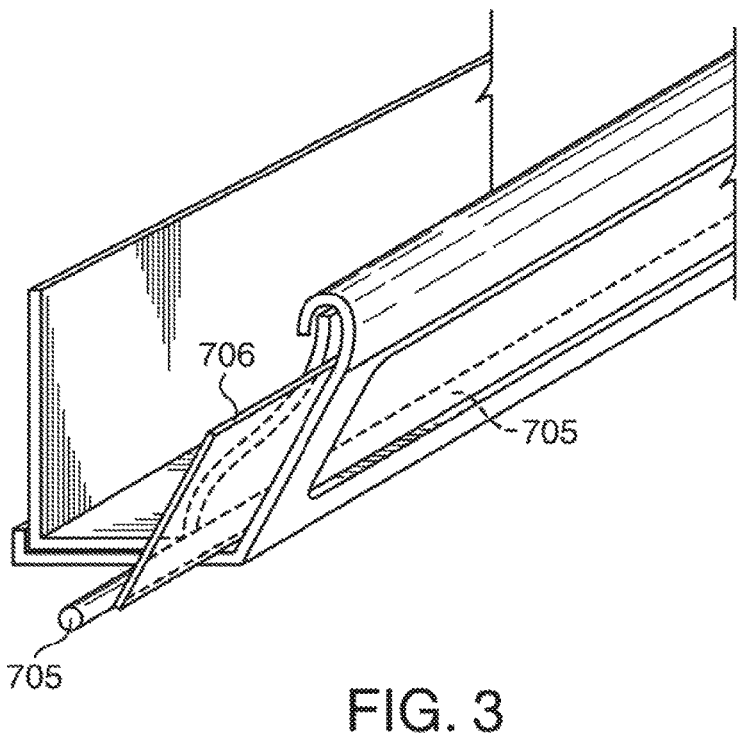
FIG. 3 provides an assembled view of an embodiment of the rain gutter illumination system. In this embodiment, the rain gutter illumination system includes an embodiment of a diffusing panel insert, but does not include an embodiment of a decorative insert.
Figure 5:
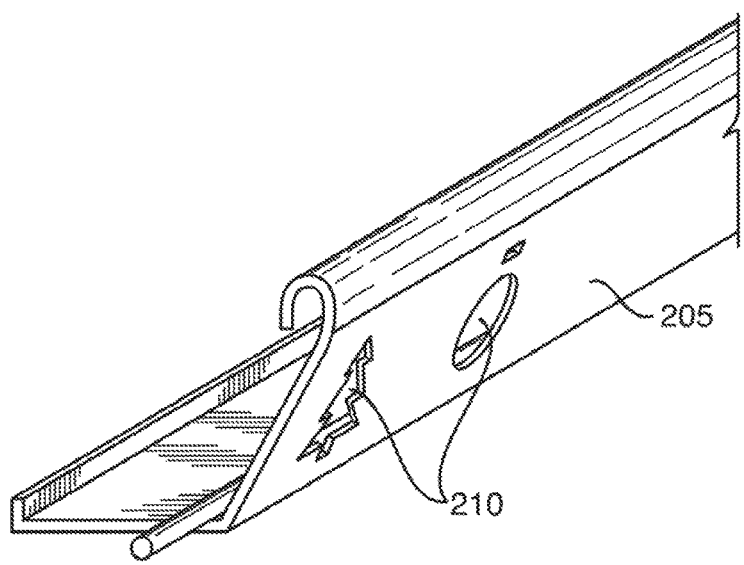
FIG. 5 provides an embodiment of the rain gutter illumination system. In this embodiment, the rain gutter illumination system does not include an embodiment of a diffusing panel, nor of a decorative insert. In this embodiment, the apertures in the illuminable surface are in a decorative shape.

In the embodiment depicted in FIG. 3, the apparatus includes a diffusing panel insert (706). The diffusing panel insert (706) serves a number of purposes, including without limitation to alter the character of the illumination projected from the apparatus by the source of illumination (705), such as by altering the distribution, color, pattern, texture, and/or intensity of the illumination. In an embodiment including a diffusing panel insert (706), a source of illumination (705) is placed behind the diffusing panel insert (706) such that illumination from the source of illumination (705) projects through the diffusing panel insert (706). In an embodiment also including the decorative insert (807), such as the embodiment depicted in FIG. 4, the diffusing panel insert (806) is placed behind the decorative insert (807). Although one purpose of the diffusing panel insert (806) is to alter the character of illumination passing through it, in an embodiment, the diffusing panel insert (806) prevents the transmission or projection of most or all of the illumination projected by the source of illumination (705). As depicted in FIG. 2, the apparatus may have neither a diffusing panel insert (400) nor a decorative insert (500), and the source of illumination (605) projects illumination directly through an aperture (604) in the illuminable surface (601). As depicted in FIG. 5, apertures (210) in the illuminable surface (205) may be decorative in shape.

In an embodiment, the diffusing panel insert (400) makes more uniform the spectator's perceived distribution of the luminosity of the source of illumination (300). In an embodiment, the diffusing panel insert (400) is tinted or colored to alter the color tone of the light projected through the diffusing panel insert (400) by the source of illumination (300). In an embodiment, the diffusing panel insert (400) contains one or more apertures. In an embodiment, the apertures in the diffusing panel (400) are in decorative shapes. In an embodiment, the diffusing panel insert (400) includes a color, tinting, texture, pattern, or other characteristic which alters the character of the illumination projected through the diffusing panel insert by the source of illumination (300). The diffusing panel insert (400) may vary in, among other things, transparency, translucence, color, texture, thickness, material, and/or pattern. The diffusing panel insert (400) may be made from any material of sufficient rigidity to maintain its own shape and which transmits illumination, including but not limited to: glass, fabric, paper, plastic, resins, cellophane, quartz, ice, ceramics, gel, or organic compounds.

Also described herein is a rain gutter illumination system comprising: a cover sized and shaped for attaching to a rain gutter and comprising: a hanger generally in an inverted U-shape and having a stem, the stem having a distal end; an illuminable surface a side element attached to the distal end of the stem, the illuminable surface side element being generally in the configuration of a longitudinally elongated contiguous rectangular prism and having an interior side and an opposing exterior side and an aperture from the interior side to the exterior side, the aperture extending substantially along the length of the side element; a base, the base being generally L-shaped and having a leg and a foot, the foot having a proximal end attached to the leg and a distal end attached to the illuminable surface side element; a decorative insert having a plurality of decorative apertures, the decorative insert being sized and shaped for sliding into the cover adjacent to the interior side of the illuminable surface side element such that at least one decorative aperture in the plurality of decorative apertures is visible from the exterior side of the illuminable surface side element through the aperture in the illuminable surface side element; a source of illumination projecting illumination through the at least one visible decorative aperture such that an illuminated representation of the at least one visible decorative aperture is visible from the exterior side of the illuminable surface side element when the cover is installed on a rain gutter and the source of illumination is illuminated in the cover.

In an embodiment, this system is further comprised of: a diffusing panel insert sized and shaped for sliding into the cover adjacent to the decorative insert such that the illumination projected through the at least one visible decorative aperture is diffused by the diffusing panel. In a still further embodiment, the diffusing panel insert is generally translucent. In an alternative further embodiment, the diffusing panel insert is generally transparent.

In an alternative embodiment, at least one decorative aperture is in the shape of a seasonally-themed symbol. In a further alternative embodiment, the at least one decorative aperture is in the shape of a typographical glyph.

In an alternative embodiment, the at least one decorative aperture is in the shape of a logo or trademark. In another alternative embodiment, the source of illumination is selected from the group consisting of: single-color lights, multi-color lights, flashing lights, blinking lights, strobe lights, runway lights, black lights.

Also described herein, among other things, is a method for decorative illumination comprising: providing a cover sized and shaped for attaching to a rain gutter and having an illuminable surface a side element generally in the configuration of a longitudinally elongated contiguous rectangular prism, the illuminable surface a side element having an aperture from the interior side to the exterior side of the illuminable surface a side element, the aperture extending substantially along the length of the side element; providing a source of illumination; providing a decorative insert comprising a plurality of decorative apertures; installing the cover on a rain gutter; placing the decorative insert in the cover such that at least one decorative aperture in the plurality of decorative apertures is visible from the exterior side through the aperture in the illuminable surface a side element; placing the source of illumination in the cover; illuminating the source of illumination; projecting illumination from the source of illuminated source of illumination through the at least one decorative aperture.

In an embodiment, the method further comprises: further providing a diffusing panel insert; placing the diffusing panel insert in the cover; diffusing the illumination projected through the at least one decorative aperture with the diffusing panel insert.

In certain embodiments, stabilizing elements may be included which inhibit unintended or undesired light leaking. In particular, if the decorative insert is not generally flush against the side element (801), light may "leak" from the edges of the aperture (804) in the side element (801), detracting from the aesthetics. This may be addressed in an embodiment through the use of one or more stabilizing elements which apply force to the decorative insert (807) to push it against the side element (801). This not only inhibits light leakage, but also inhibits movement caused by environmental forces, such as high winds which can cause the insert to "rattle" in the cover, producing undesirable noise.

Figure 8A:
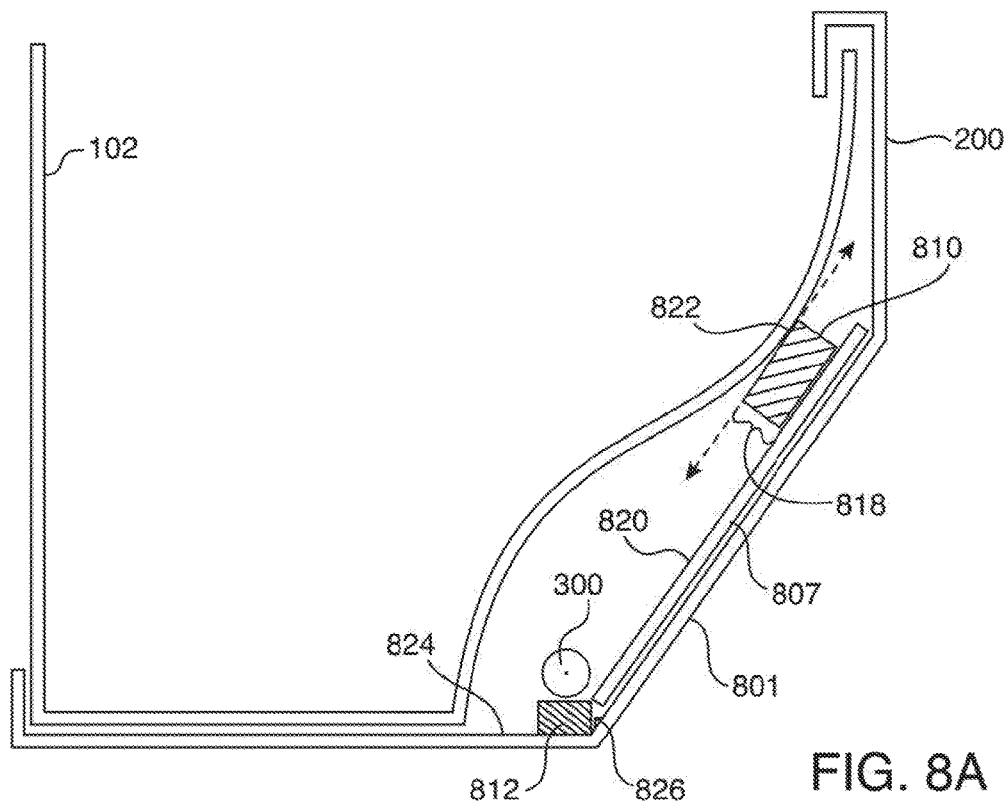
FIGS. 8A-8B depict alternative embodiments of a rain gutter illumination system using foam stabilizing elements.

For example, in the embodiment depicted in FIG. 8A, a foam block (810) is attached to the back of the decorative insert (807). The foam block (810) is sized and shaped so that when the foam block (810) is attached to the decorative insert (807) and the decorative insert (807) is installed in the cover (200), the foam block (810) physically contacts the exterior of the rain gutter (102). Generally, the dimensions of the foam block (810) are such that the foam block is compressed when inserted. That is, the depth (818) of the foam block is larger than the distance between the back surface (820) of the decorative insert (807) and the closest point (822) on the rain gutter (102). The foam bock (810) is generally located or placed on the decorative insert (807) such that when the decorative insert (807) is installed in the cover (200), the foam block (810) will be between the back surface (820) and the closest point (822) of the rain gutter (102). This provides friction between the rain gutter (102) and foam bock (810). If the foam block (810) is affixed to the decorative insert (807), movement of the decorative insert (807) is inhibited. Moreover, the tendency of the compressed foam block (810) to regain its natural, uncompressed shape and dimensions applies outward pressure on both the rain gutter (102) and the back surface (820) of the decorative insert (807). This pressure reduces the gap, if any, between the decorative insert (807) and the side element (801), reducing or eliminating light leakage.

Figure 8B:
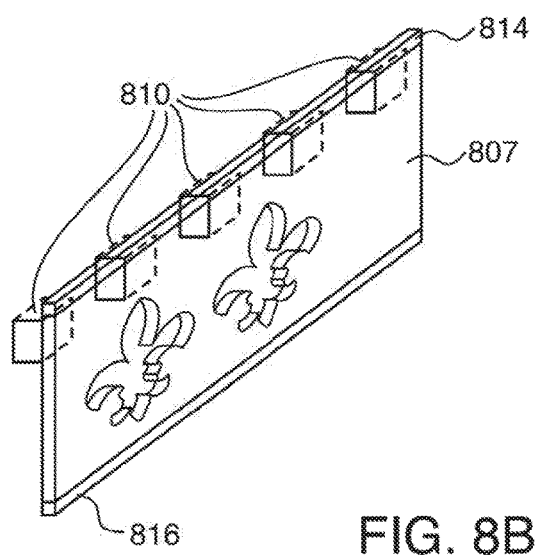

In an embodiment, multiple foam blocks (810) of varying shapes or sizes may be used, depending on where light leakage is experienced. By way of example and not limitation, if light leakage is detected at the bottom, a larger block (not depicted) may be used, in similar fashion, to keep the bottom of the decorative insert (807) flush with the side element (801). The size and shape of the foam block (810) will naturally vary depending on the particular configuration of the rain gutter (102) and cover (200). In an embodiment, one or more blocks (810) may not be cubic or rectangular, but rather may be any three-dimensional shape, not necessarily limited to polyhedral configurations. By way of example and not limitation, the foam block (810) may be a single elongated block along some or all of the length of the decorative insert (807). Alternatively, a plurality of foam blocks (810) may be attached, such as in the decorative insert (807) depicted in FIG. 8B.

In an embodiment, other stabilization elements may additionally, or alternatively, be included. Stabilizing elements may also be attached to the cover (200). By way of example and not limitation, in the depicted embodiment of FIG. 8A, a stabilizing element (812) is affixed to the interior of the cover (200) such that the stabilizing element (812) contacts the decorative insert (807). This reduces lateral movement of the decorative insert (807) in the cover (200), improving aesthetic appearance and reducing unintended movement, such as during installation, inclement weather, or tampering. This may also allow the device to be installed and used in conjunction with a rain gutter (102), or other attachment point, where the device is installed at an angle or incline. In the depicted embodiment of FIG. 8A, a foam block (812) is affixed to the top surface (824) of the base, but the positioning may vary. By way of example and not limitation, the foam block (812) could be affixed to the interior surface (826) of the side element (801). As with foam block (810), the side, shape, and placement of a foam block (812) affixed to the cover (200) may vary from embodiment to embodiment. The foam block (812) may be a single foam block, such as a longitudinally elongated foam block, or may be one of a plurality of foam blocks.

In a still further embodiment, one or more stabilizing elements (814) may be affixed to the top or bottom of the decorative insert (807) to stabilize it in the cover (200). By way of example and not limitation, in the depicted embodiment of FIG. 8B, a foam block (814) is affixed to the top edge of the decorative insert (807). The depicted foam block (814) is generally in the configuration of a longitudinally elongated rectangular prism generally affixed longitudinally to the top edge of the decorative insert (807). The depicted foam block is about the same thickness as the insert (807), which allows the foam block (814) to also fit into a cover (200) configured to accept the insert (807). As with other compressible stabilizing elements, such as foam block (810), it is generally expected that the dimensions of the foam block (814) will be such that the foam block (814) compresses at least somewhat when inserted, and the force of the foam block (814) attempting to return to its natural, uncompressed shape provides additional friction, holding the decorative insert (807) in place. Similar principles apply to a lower foam block (816), which may additionally or alternatively be used.

Although foam blocks are described, other stabilizing elements are known in the art and may also, or alternatively, be used. Where foam is used, any type of foam may be used, but a lightweight foam with a relatively high coefficient of friction is preferred. It is also preferred that the foam be weather-resistant and fire-resistant, as the blocks may be near or adjacent to the source of illumination (300), which may produce substantial heat in the confined interior of the cover (200), or which may be an open flame. The foam need not be permanently attached to the decorative insert, but because the foam will generally experience shearing force when the decorative insert (807) is slid into the cover (200), installation is simpler if the foam is glued or otherwise attached in a rigid or semi-rigid manner.

Figure 9A:
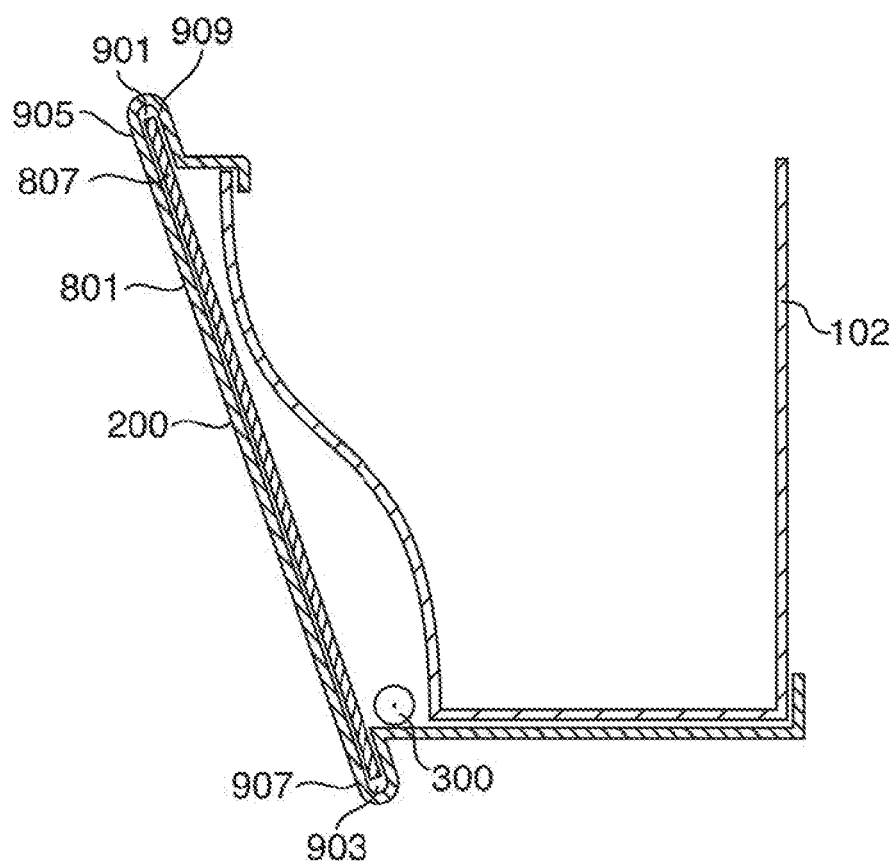
FIGS. 9A-9B depict alternative embodiments of a rain gutter illumination system having structural stabilizing elements.
Figure 9B:
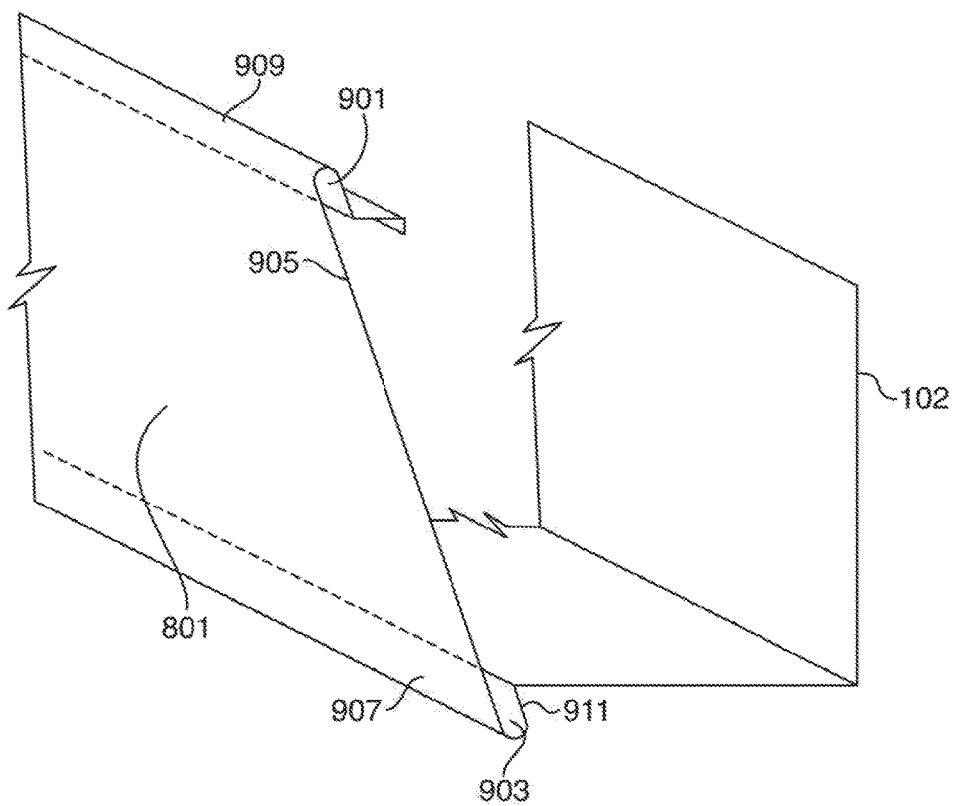

In a still further embodiment, stabilization and/or flushness are addressed through cover shapes. By way of example and not limitation, in the depicted embodiments of FIGS. 9A and 9B, side element (801) is sized and shaped to retain the decorative insert (807) with opposing recesses (901) and (903) at the opposing top (905) and bottom (907) edges of the side element (801). The depicted channels are generally in the configuration of a channel or trough. The cover (200) of FIG. 9A comprises a top channel (901) formed by a top retaining element (909) generally in the configuration of an inverted U-shape, and an opposing bottom channel (903) formed by a bottom retaining element (911) generally in the configuration of a U-shape (911). The top retaining element (909) is generally a part of, or rigidly affixed or attached to, the side element (801) along the top edge (905) of the side element (801). In the depicted embodiment, the top retaining element (909) is situated between the top edge (905) of the side element (801) and the hanger. Likewise, the bottom retaining element (911) is generally rigidly attached to the bottom edge (907) of the side element (801), and situated between the bottom edge (907) of the side element and the base.

The U-shape of the top and bottom retaining elements (909) and (911) is formed by two stems or legs connected by a cross-element. Generally, retaining elements (909) and (911) are attached such that the channels (901) and (903) are on the same side of the side element (801). This is so that the channels (901) and (903) are opposing and open towards one another, allowing a decorative insert (807) of the appropriate size and shape to be slid into the cover (200) such that the top of the decorative insert (807) is within the top channel (901) and the bottom of the decorative insert (807) is within the bottom channel (903). The channels then generally hold the decorative insert (807) in place and inhibit movement. For the top retaining element (909), the stem not attached to the side element (801) is generally attached to the hanging element. For the bottom retaining element (911), the stem not attached to the side element (801) is generally attached to the base.

The depicted retaining elements (909) and (911) are, like the depicted side element (801), generally longitudinally elongated, such that when the cover (200) is attached to a rain gutter (102), the retaining elements (909) and (911) generally run the length of the gutter, at least the same extent as the cover (200). This allows one or more decorative inserts (807) installed in the cover (200) to run the length of the cover (200). The retaining elements (909) and (911) are attached to the side element (801) in a generally flush fashion—that is, the corresponding stems of the opposing retaining elements (909) and (911) attached to the side element (801) such that the opposing attached stems and side element (801) are generally coplanar. Again, this conforms to the shape of the decorative insert (807) and facilitates a snug fit of the opposing ends of the decorative insert (807) in the opposing channels (901) and (903), inhibiting movement and improving flushness.

The dimensions and shape of the retaining elements (909) and (911) will necessarily vary from embodiment to embodiment, but it is generally contemplated that the retaining elements (909) and (911) are sized and shaped to form channels (901) and (903) whose widths are about the same as the thickness of the components to be held in place by the retaining elements (909) and (911). By way of example and not limitation, if a decorative insert alone is to be used, having a thickness of one-eighth of an inch, retaining elements (901) and (903) are generally sized and shaped so that the channels (901) and (903) are about one-eighth of an inch across, or just slightly more, and will snugly accommodate a one-eighth inch insert. Also by way of example and not limitation, where both a decorative insert and diffusing panel are to be used, and the combination of the two has a thickness of one-quarter of an inch, the retaining elements (901) and (903) are generally sized and shapes so that the channels (901) and (903) are about one-quarter of an inch across, or just slightly more, and will snugly accommodate a one-quarter inch thick combined decorative insert/diffusing panel.

In an embodiment, these retention elements may be used alternatively, or additionally, to other stabilization elements, including but not necessarily limited to the foam blocks described elsewhere herein.

Figure 10:
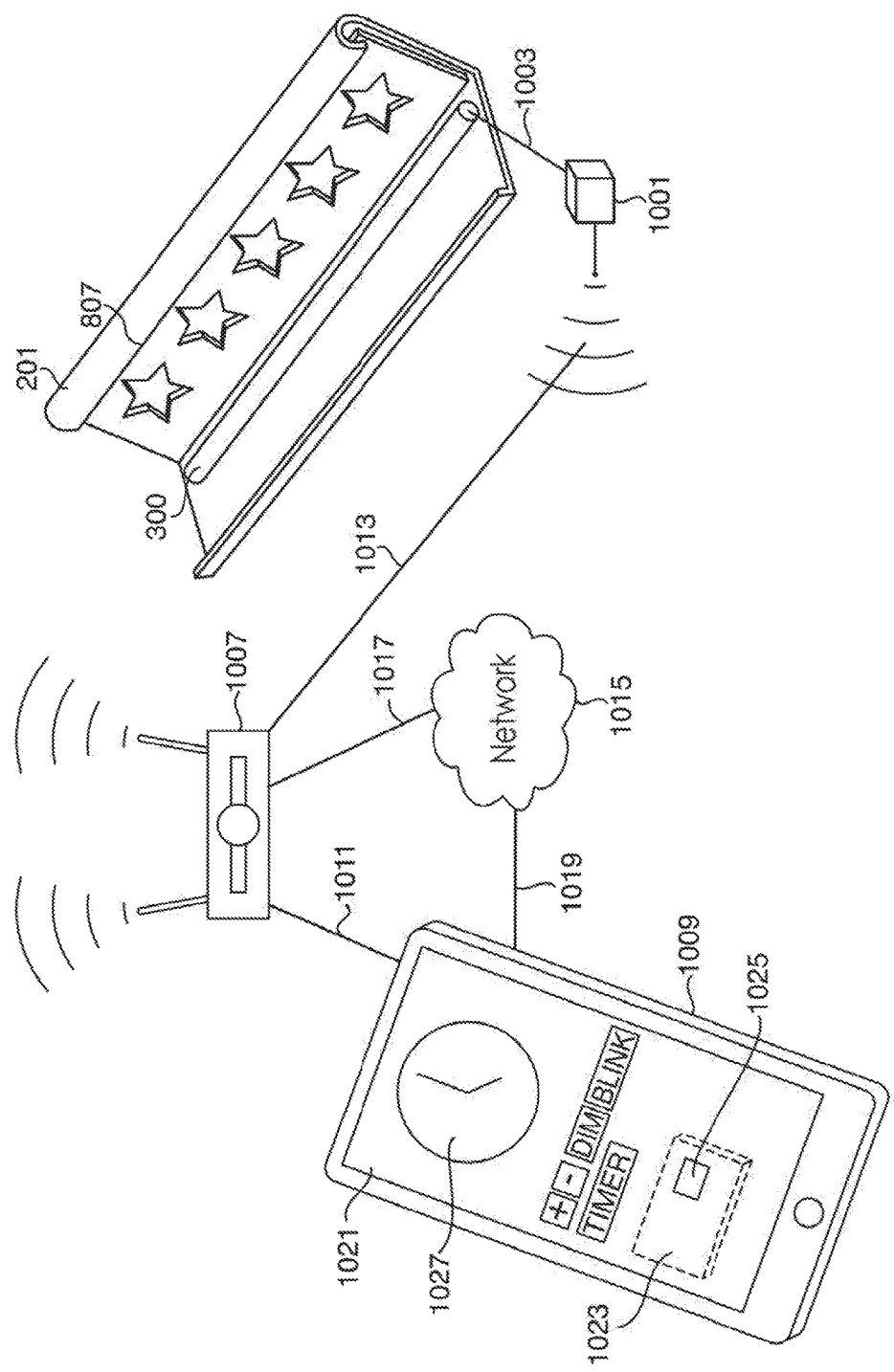
FIG. 10 depicts a system for illuminating a rain gutter using a remote control device to control the lights.

In an embodiment, the source of illumination is controlled by a remote control device, such as in the depicted embodiment of FIG. 10. In the depicted embodiment, the source of illumination (300) is a light rope communicatively coupled (1003) to a controller (1001), but any controllable source of illumination (300) may be used. The controller (1001) is generally an electric or digital electronic device with circuitry and/or programming for causing, via the communicative coupling (1003), the light rope (300) to exhibit certain illumination patterns, behaviors, or characteristics. Such characteristics are described, in part, elsewhere herein, and may include, but are not necessarily limited to: turning on, turning off, blinking, flashing, running lights, landing lights, patterns, alternative blinking, changes in color, changes in intensity or luminosity, strobe, and pulsing. The depicted controller (1001) is an external component, but in an embodiment, the controller (1001) may be integrated with or into the source of illumination (300).

The remote control device (1009) may be any device communicatively coupled to the controller (1001), whether directly, indirectly, or both, and capable of sending commands or instructions to the controller (1001). While special purpose devices with particular circuitry or programming for doing so are contemplated, the more typical embodiment is that a smart phone (1009) or other similar technology, such as a tablet computer, is used for this task via a specialized application (1025) stored on a computer-readable medium (1023) in such device (1009). Although a smart phone (1009) is depicted, the device (1009) may be any programmable computing device, including but not necessarily limited to a laptop, PC, tablet computer, smart watch or other wearable technology, home automation system, and so forth.

In the depicted embodiment of FIG. 10, the remote control device (1009) is communicatively coupled indirectly to the controller (1001) through a local wireless network. In the depicted embodiment, the remote control device (1009)

is communicatively coupled (1011) to a wireless router (1007), and the wireless router (1007) is communicatively coupled (1013) to the controller (1001). In the depicted embodiment, commands or instructions sent from the remote control device (1009) to the controller (1001) are routed over a local wireless network using TCP/IP and/or other protocols known in the art. The commands or instructions are then sent (1013) from the router (1007) to the controller (1001) and the controller (1001) may interpret and/or execute the instructions to cause the light (300) to behave as instructed.

Alternatively, where the remote control device (1009) is too far away from the wireless router (1007) for a local connection (1011), the user may connect to the router (1017) over a wide-area telecommunications network (1015), such as but not necessarily limited to the Internet (1015). In the depicted embodiment, the remote control device (1009) is communicatively coupled (1019) to a telecommunications network (1015), and the wireless router (1017) is also communicatively coupled (1017) to the telecommunications network (1015). Instructions sent from the remote control device (1009) are routed over the network connection (1019) to the network (1015), and then to the router (1007) through its (1007) connection (1017) to the network (1015), and then from the router (1007) to the controller (1001) through a local connection (1013).

In a still further embodiment, the controller (1001) may be capable of direct wireless communication (1029) with the remote control device (1009) through a wide-area wireless network connection. By way of example and not limitation, in an embodiment, the controller (1001) includes or is otherwise communicatively coupled by, through, or to a cloud computing network (1015), through which the remote control device (1009) communicates with the controller (1001). In a further embodiment, the system uses Apple® Homekit™ via iCloud®.

It is specifically contemplated that the controller may provide information or data back to the remote control device (1009). This information may be anything pertinent to the operation of the system, such as identifying dead bulbs, battery life estimates, on/off status, current operational mode, timer settings, schedule settings, warnings, and error or diagnostic codes. Such information may be displayed to the user on the remote control device (1009) via a graphical user interface (1027) displayed on the device (1009) display (1021).

It will be appreciated that certain components described herein necessarily contain additional hardware and/or circuitry not necessarily specifically described herein but inherent or implied by this disclosure. By way of example and not limitation, where the controller (1001) communicates wirelessly with a router (1007) or other wireless communication device, the controller (1001) includes or is communicatively coupled to a wireless transmitter/receiver for such communication. Likewise, a smart phone (1009) is known in the art to include one or more wireless communication technologies, including WWAN, WLAN, and WPAN networks, such as but not necessarily limited to: cellular data protocols such as 3G, 4G, LTE, and the WiMAX/IEEE 802.16 family of protocols; the IEEE 802.11 family of protocols, colloquially known as WiFi™; the IEEE 802.15 family of controls, commercially known as Bluetooth®; near-field communication and other radio-frequency identification standards or protocols. Similarly, it is known in the art that wired implementations may be replaced or supplemented by wireless, and vice versa. Thus, the router (1007) depicted and described herein implicitly and/or implied discloses a wired router as well.

Although two exemplary network communication routes are depicted, a large number of communication architectures and topographies are possible, and may not necessarily use WiFi™ For example, in an embodiment, the device (1009) may be directly communicatively coupled to the controller (1001), such as through Bluetooth® or another short-range protocol, or through a proprietary or specialized protocol. In a still further embodiment, the device (1009) may not be wirelessly coupled, but rather may be a wired device. Such a wired device may be, without limitation, a wall panel or other control panel having a direct or indirect wired connection to the controller (1001).

Additionally, although the controller (1001) is depicted as being physically located in or near the light (300), it is specifically contemplated that the controller (1001) may itself be remote from the light (300). By way of example and not limitation, the controller (1001) may be located inside the structure, and communicatively coupled (1003) to the light (300) from within the structure. This may be done wired or wirelessly. This has the advantage of allowing access to, and manual configuration of, the controller (1001) from within the comfort and warmth of the home, which may be convenient for troubleshooting in cold winter months, and may also inhibit tampering or theft.

Generally speaking, the mobile device application (1025) allows a user to control the appearance, behavior, or characteristics of the light (300) remotely by providing a user-manipulable graphical user interface (1027) displayed to the user on a display (1021) of the device (1009). This application may allow users to change the light color, such as by using a color wheel as depicted, turn the lights on or off, set timers or schedules for illumination or light shows, turn on or off only certain strands or portions of the light, which may be custom-defined by the user, alter the intensity or luminosity of the lights, and so forth as described elsewhere herein. Where the remote control device (1009) is not a smart phone, the device (1009) may have manually manipulable controls, such as dials, buttons, switches, and other such elements, which are manipulated by the user to send commands. In a still further embodiment, the remote control device (1009) may be, include, incorporate, or be included in or incorporated by, in whole or part, the controller (1001).

The remote control device (1009) may synchronize or pair with a plurality of controllers (1001), allowing a plurality of lights to be controlled thereby. In an embodiment, remote control device (1009) allows the user to identify, name, or define one or more lights and/or controllers (1001), such as by allowing the user to give a controller/string a name in a smart phone application (e.g, "Garage String," "Back Door," "Driveway Right Side"). The user may then manipulate the behavior of individual lights via the remove control device (1009) by issuing comments to individual controllers. Alternatively, the user may group, associate, or "zone" controllers and lights and control groups. By way of example and not limitation, a user may synchronize all light strings on the front of a structure as "Front Yard" in the application and when the user manipulates the "Front Yard" zone or group, all lights attached to controllers belonging to that group are given the instructions provided by the user (e.g., turn on, turn off, blink, change color, etc.). A user may cause different controllers or zones/groups of controllers to exhibit different behavior at the same time, or may provide instructions, scripts, or other programmatical instructions to affect light behavior.

While the invention has been disclosed in connection with exterior rain gutters, it should be noted that the systems and methods described herein are suitable for other applications as well, including interior applications, though the particular shape and structure of the cover may necessarily change. By way of example and not limitation, it is specifically contemplated that the systems and methods may be used in connection with lighting for pools, decks, fences, path ways (such as but not limited to walking paths, sidewalks, driveways, roads, lanes, movie theater rows, airplane rows, escape paths during an emergency, and the like), perimeter lighting (including but not limited to floor lighting, such as to show the location of walls, doors, or obstacles in a room or hall), directional or navigational lighting, mailboxes and other landscaping, spotlighting, floor lighting, and so forth.

In an embodiment, the remote control device (1009) may be automatically controlled, such as by a timing switch, motion detector, light sensors, humidity or precipitation sensor, or another sensor which may provide an input usable by a controller to operate the lights. By way of example and not limitation, lights may automatically turn off at a particular, generally pre-defined time, but may also turn on (again, generally for particular pre-determined amount of time) if a motion sensor communicatively coupled to the controller (1001) detects motion.

It is further contemplated that the system may include a means or mechanism for enforcing security and interoperability. For example, a sensor or other component may be included, attached to, or integrated into a decorative insert, which sensor is then detected by another component of the system, such as the controller (1001) or remote control the remote control device (1009). If the security component is not detected, the light will not operate. This prevents the lights from operating in the event that a decorative insert is missing, stolen, or otherwise not in place, preventing an unpleasing appearance. It also enforces system interoperability. By way of example and not limitation, in an embodiment, an RFID tag is included, attached, embedded, or otherwise integrated into the decorative insert, such as that if the controller does not detect the correct RFID tag, the lights will not operate. This can be used to prevent customers from using third-party inserts.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A rain gutter illumination system comprising:
a longitudinally elongated cover configured to attach to the exterior of a rain gutter and comprising:
an aperture through said cover extending substantially along the length of said cover;
a generally U-shaped top channel;
a generally U-shaped bottom channel, said top channel and said bottom channels being on opposing sides of said aperture; and
an insert having at least one decorative apertures, said insert sized and shaped to slide into said cover at said top channel and said bottom channel so that at least one of said decorative apertures is visible through said cover aperture;
wherein when a source of illumination is illuminated in said cover, said source of illumination projects illumination through said at least one visible decorative aperture.

2. The system of claim 1, wherein said top channel and said bottom channel are configured to cause said insert to be generally parallel to said cover when said insert is installed in said cover.

3. The system of claim 1, further comprising:
wherein a stabilizing element affixed to the interior side of said cover such that when said insert is in said cover, said stabilizing element inhibits movement of said insert.

4. The system of claim 3, wherein said stabilizing element is a foam block.

5. The system of claim 4, wherein said foam block is sized and shaped to hold said insert adjacent to said cover.

6. The system of claim 1, further comprising:
a source of illumination;
a controller communicatively coupled to said source of illumination;
a remote control device communicatively coupled to said controller and causing said controller to control said source of illumination according to a user-supplied input to said remote control device.

7. The system of claim 6, wherein said remote control device is a digital computer.

8. The system of claim 7, wherein said digital computer is a mobile device.

9. The system of claim 8, wherein said mobile device is a smart phone or tablet computer.

10. The system of claim 6, wherein said remote control device is communicatively coupled to said controller at least in part using a wireless local area network.

11. The system of claim 6, wherein said remote control device is communicatively coupled to said controller at least in part using a wide area network.

12. The system of claim 11, wherein said wide area network is the Internet.

13. The system of claim 6, wherein controlling said source of illumination comprises turning said source of illumination on or off.

14. The system of claim 6, wherein controlling said source of illumination comprises altering the luminosity of said source of illumination.

15. The system of claim 6, wherein controlling said source of illumination comprises altering the visible color of the illumination provided by said source of illumination.

16. The system of claim 6, wherein controlling said source of illumination comprises causing said source of illumination to blink.

17. A method of illuminating a rain gutter comprising:
providing a rain gutter cover having an aperture therethrough;
providing a decorative insert configure for sliding into said cover, said decorative insert having at least one decorative apertures therethrough;
providing a source of illumination;
attaching said cover to a rain gutter;
sliding said insert into said cover;
placing said source of illumination in said cover between said insert and said rain gutter; and
illuminating said source of illumination.

18. The method of claim 17 further comprising:
providing a controller communicatively coupled to said source of illumination;

providing a remote control device communicatively coupled to said controller; and with said remote control device, causing said controller to control said source of illumination according to a user-supplied input to said remote control device.

19. The method of claim 18, wherein said remote control device is communicatively coupled to said controller at least in part using a telecommunications network.

* * * * *